Figure 1:
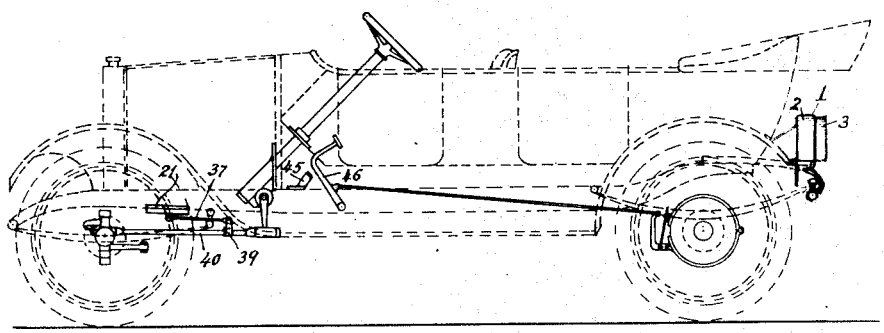

R. LA SELVA.
REAR SIGNAL FOR AUTOMOBILES.
APPLICATION FILED MAY 6, 1918.

1,308,873.

Patented July 8, 1919.
2 SHEETS—SHEET 1.

WITNESSES

INVENTOR
ROCCO LA SELVA
BY
ATTORNEYS

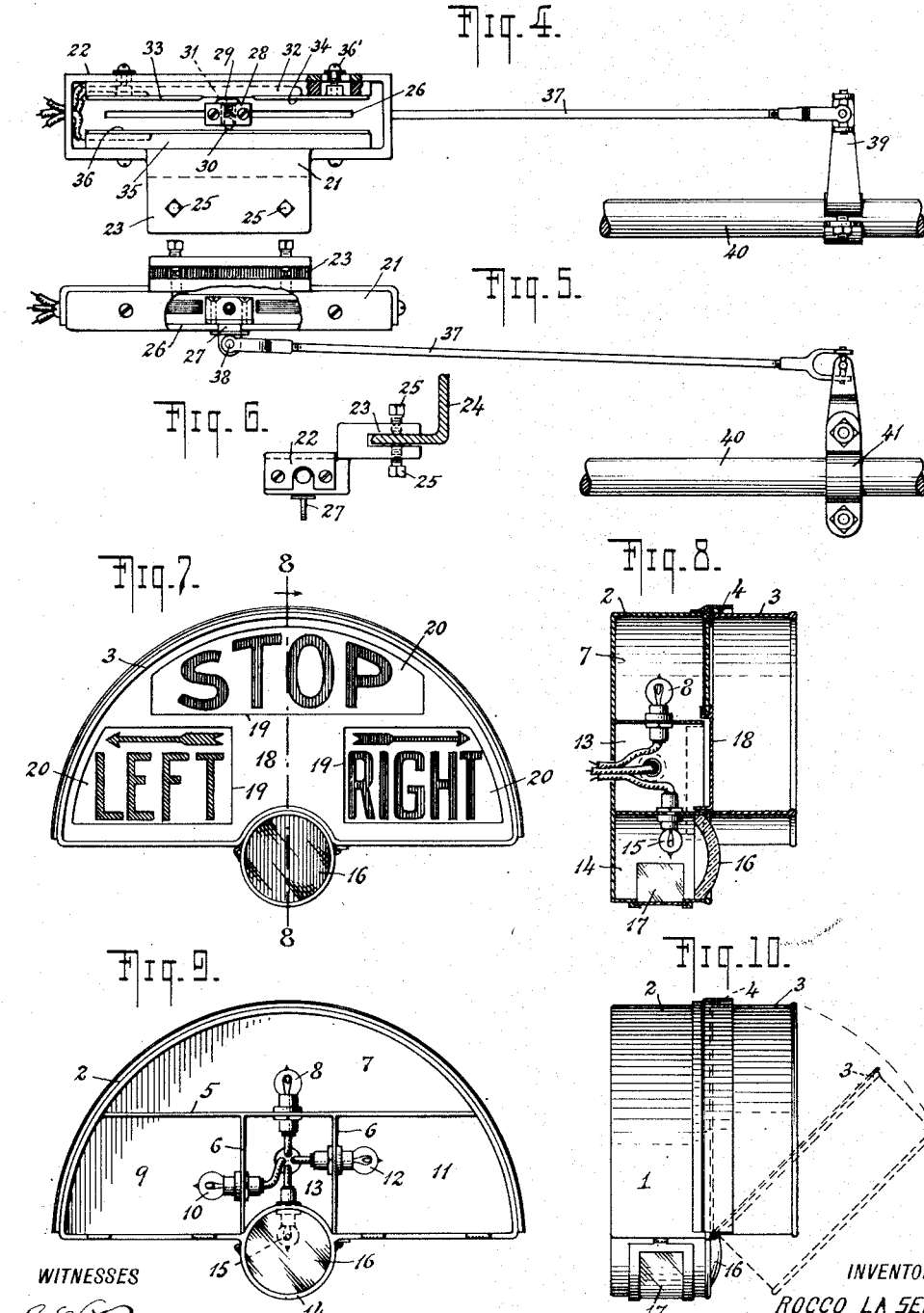

UNITED STATES PATENT OFFICE.

ROCCO LA SELVA, OF NEW YORK, N. Y.

REAR SIGNAL FOR AUTOMOBILES.

1,308,873. Specification of Letters Patent. Patented July 8, 1919.

Application filed May 6, 1918. Serial No. 232,690.

*To all whom it may concern:*

Be it known that I, ROCCO LA SELVA, a citizen of the United States, residing in the city, county, and State of New York, have invented certain new and useful Improvements in Rear Signals for Automobiles, of which the following is a specification.

In the operation of automobiles, particularly in urban districts where traffic is dense, the driver is obliged to slow-up or stop at frequent and unexpected intervals, either because of congestion in front of him or because he desires to leave the main highway to the one side or the other. In such cases it is usual to signal vehicles in the rear by raising and extending the arm outwardly through the car. Such signals, however, are not always seen or capable of being seen and, when the car top is up, or if the car is of the closed type, are practically incapable of being made; such signals, furthermore, are tiring and the necessity of making them tends to distract the attention of the driver. They also interfere, to a certain extent, with his control of the steering gear.

These hand signals, furthermore, are obviously ineffective as an indication that the driver intends to leave the highway to right or left.

For the above reasons, therefore, various plans and devices have been proposed for the operation of a visual signal at the rear of the car.

The object of my invention, about to be described, is to provide a signal mounted upon the rear of a car and adapted to be operated by means known to those skilled in the art so that whenever the car is slowed or stopped, or steered to the right or left, whether in the daytime or at night, the same may be properly indicated in a plain and definite manner. Such selected operating means may, of course, be manual at the discretion of the driver or may be automatic, thus requiring no conscious attention on the part of the driver.

A further object of my invention is to provide a specific embodiment of signal proper, *i. e.*, of a suitable casing containing the requisite lamps and signal legends, including the usual tail light, the whole being constructed so that all parts are readily accessible for examination, replacement, or repairs.

The invention resides in certain features of construction, as will hereinafter be described.

Essentially, my invention comprises a casing or mounting adapted to be attached to the rear of the car containing, in addition to the usual tail light, a plurality of lamps placed behind a corresponding plurality of glass or celluloid plates upon which are severally printed the legends "Stop," "Right" and "Left." This casing is so constructed that, whether in the daytime or at night, an individual lamp, when lighted behind a particular legend, will cause said legend to appear or stand out conspicuously. As a preferred method of operating my improved signal, although constituting no part of the invention, electrical connections run from the "right" and "left" signal lamps to the regular starting and ignition battery and to a suitable switch which is attached to the chassis and operated by a link connected to the drag link so that one or the other of these signal lamps is lighted, dependent upon whether the car is turned in the one direction or the other. Connections from the third or "stop" signal lamp are similarly carried to the battery and to a switch adapted to be closed by the operation of the foot brake. Whenever the driver depresses the foot brake, therefore, the "stop" signal lamp will be turned on and the "stop" signal illuminated.

Figure 2:
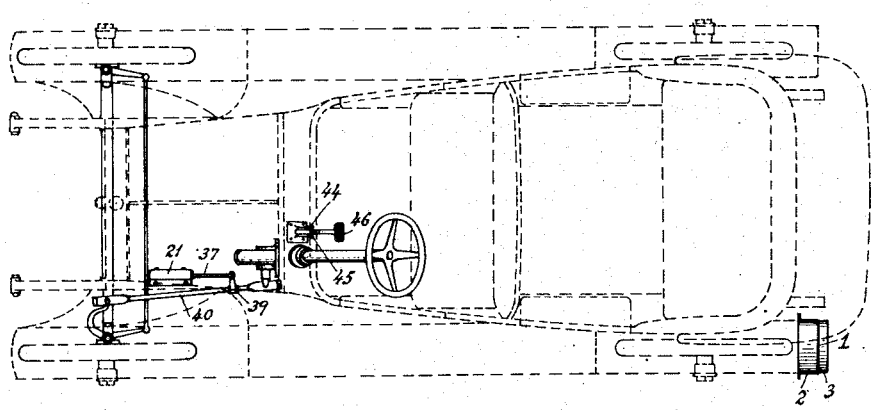
Figure 3:
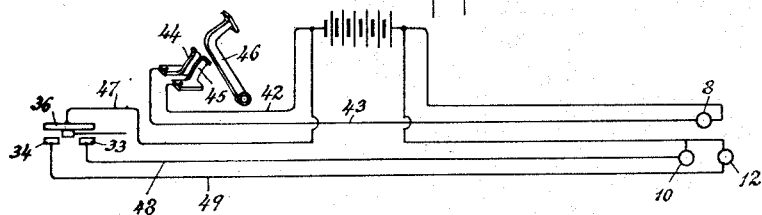

My invention will be better understood by referring to the accompanying drawings, in which Figure 1 represents a side elevation, and Fig. 2 a plan, of an automobile having a preferred form of my improved signal attached thereto, the essential parts of the invention and of the means by which it is operated being shown in solid lines while the remaining structure is shown dotted; Fig. 3 shows the several signal lamps, their circuits and operating switches, in diagrammatic form; Fig. 4 is an enlarged plan view of the direction switch, (with its cover removed) and its operative mechanism, which controls the "right" and "left" signals; Fig. 5 represents the showing of Fig. 4 viewed from the front; Fig. 6 represents the showing of Fig. 4 viewed from the left; Fig. 7 is an elevation, taken from the rear of the casing in which the several lamps and legends are mounted as it appears when in position on the car; Fig. 8 is a section taken along the line 8—8 of Fig. 7; Fig. 9 is a view similar to Fig. 7 but with the casing cover removed;

and Fig. 10 is an edge view of Fig. 7 showing (in dotted lines) the casing cover when partly open.

Referring to the drawings, the casing or housing, 1, is mounted upon the rear end of one the rear mud guards; or it may be mounted in any other usual position upon the rear of a car. This casing may be made of sheet metal and, in the embodiment shown, is given a semicircular shape. It comprises a lamp container section, 2, and a hood or cover section, 3, the latter being hinged to the container section along its bottom edge and normally held in closed position by means of a catch, 4, of any usual type.

The container section is provided with a transverse partition wall, 5, and vertical partition walls, 6, symmetrically disposed at each side of the center whereby are constituted a top compartment, 7, for the "stop" signal lamp, 8, a left-hand compartment, 9, for the "left" signal lamp, 10, and a right-hand compartment, 11, for the "right" signal lamp, 12. A central compartment, 13, is also formed and included by the walls, 5, and 6, and into and through this compartment pass the wires by means of which the electric current is carried to the lamps.

The bottom of compartment, 13, is convexed upwardly and merges with a lower downwardly convexed section, 14, to constitute a separate compartment for the usual tail lamp, 15. This compartment has the usual front red glass, 16, and the bottom colorless transparent sector, 17, for the illumination of the license plate.

The cover section, 3, is open in front and has a sheet metal back, 18, from which sections are cut along the lines, 19, thus providing spaces or openings which are filled by plates, 20, having printed, etched, or otherwise formed thereon, the several legends "Stop," "Left" and "Right". Arrows are also preferably provided on the "left" and "right" legends to indicate these respective directions. The plates, 20, are preferably of different colors, the "stop" plate being red, the "left" plate, green, and the "right" plate, red, for example; or other colors may be chosen. In this way a given color may come to be accepted as having the definite directive meaning of the legend with which the color is associated.

The back, 18, may, preferably, have the the edges of the openings for plates, 20, flanged so that said plates may be readily slid into place or removed for cleaning and may be quickly replaced in case of accident.

To remove or replace individual signal lamps, the catch, 4, is released and the cover section, 3, swung outwardly, as shown dotted in Fig. 10.

The "right" and "left" signals are controlled by a switch 21 comprising a switch casing, 22, having an attached slotted bracket, 23, adapted to be slid over one of the legs or flanges of the chassis side bar, 24. Set screws, 25, permit the bracket to be tightly and permanently clamped to said flange.

The switch casing, 22, is slotted at, 26, along one side thereof so as to receive slidably the shank, 27, of a switch member, 28, upon one side of which is mounted a contact stud 29. A depressible contact stud, 30, is mounted on the other side of the switch member and permanently connected with contact stud, 29, by means of a spring, 31, which tends to press them apart.

Mounted upon the inside of the casing at one side thereof upon an insulating block, 32, attached thereto, is a pair of spaced contact strips, 33, 34. On the other side of the casing and also mounted on an insulating block, 35, is a continuous contact strip, 36. The spaced strips are linearly adjustable upon block, 32, so as to vary their distance apart and from the center of the switch, set screws, 36', being used to clamp the strips fast at any desired point.

Shank, 27, has a link, 37, pivotally attached thereto at 38. The other end of link, 37, is pivotally attached by a universal joint to one end of an arm, 39, whose other end is shaped to fit over the drag link, 40, and cooperate with a clamping member, 41. Arm, 39, is clamped fast upon the drag link at such a point that, when the automobile is pointing straight ahead, the switch member, 28, will be midway between the two contact strips 33, 34.

The two circuit wires, 42, 43, controlling the lamp for the "stop" legend are joined to the two blades 44, 45, of a knife-switch mounted just under the foot brake, 46, in such position that when the foot brake is depressed it will bridge the gap between the blades and close the "stop" circuit, thus illuminating the "stop" legend.

A circuit wire, 47, is carried from one side of the battery to the continuous contact strip, 36. And wires, 48, 49, for the "left" and "right" lamps, respectively, are connected with the spaced contact strips, 33, 34 (see Fig. 3). Hence, when the switch member, 28, is sufficiently distant from the center of the switch casing to enable the two contact studs, 29, and, 30, and the spring, 31, to connect together the continuous contact strip 36, with the contact strip, 34, the "right" signal lamp will be energized, thus illuminating the legend "Right." And when, on the other hand, the switch member, 28, is sufficiently distant from the center of the switch casing in the other direction to enable the continuous contact strip, 36, and the shorter contact strip, 33, to be connected together, the "left" signal lamp will be energized, thus illuminating the legend "Left."

This position of the switch member, 28, "off center" in the switch casing as described, will be brought about by the movement of the steering wheel operating to turn the car to the right or left as the case may be.

The degree to which the car must be turned to right or left in order to illuminate the corresponding "right" and "left" legends will, of course, depend upon the distance apart of the shorter strips, 33, and, 34, and the distance of each of said strips from the center. Preferably they should be so set that the signals will not be operated for slight changes of direction such as take place on a crowded highway when it is necessary to pass a vehicle ahead or permit a vehicle behind to pass.

Instead of connecting the switch member, 28, to the drag link, as shown and described, I may connect it with any other member which is controlled by and moves in correspondence with the steering gear.

Owing to the depth or overhang of the hood the several signal legends are at the rear of what is, substantially, a "dark box;" the legends, when illuminated from their rear, therefore, will be displayed conspicuously even in broad daylight.

My invention resides in the construction and arrangement of the casing and its contained signal lamps, as defined in the claim which follows, and is not concerned with the operative means. Instead of the particular and preferred operative means shown and described, other means may be readily suggested by those skilled in the art.

Having described my invention, I now claim:

In a rear signal for automobiles, a casing comprising a lamp container section provided with a central compartment and outer surrounding compartments, the peripheral walls of the central compartment respectively supporting electric signal lamps contained in the outer compartments, the circuit wires for the lamps entering the central compartment from the rear and going to the bases of the lamps through the several walls; and a hood or cover section open in front and hinged along an edge to the container section, the back of the cover section being closed and including transparent legend plates, the closed back as a whole constituting a closure for the container section and the peripheral walls of the cover section being sufficiently deep to give the cover section the qualities of a dark box.

In testimony whereof I have hereunto set my hand.

ROCCO LA SELVA.